United States Patent
Steffen

(10) Patent No.: US 8,833,031 B2
(45) Date of Patent: Sep. 16, 2014

(54) DEVICE FOR SECURING A SUPPORT STRUCTURE TO A FLAT ROOF

(75) Inventor: Markus Steffen, Grabs (CH)

(73) Assignee: SFS Intec Holding AG, Heerbrugg (CH)

( * ) Notice: Subject to any disclaimer, the term of this patent is extended or adjusted under 35 U.S.C. 154(b) by 0 days.

(21) Appl. No.: 13/615,989

(22) Filed: Sep. 14, 2012

(65) Prior Publication Data

US 2013/0000243 A1    Jan. 3, 2013

Related U.S. Application Data

(63) Continuation of application No. PCT/EP2011/060341, filed on Jun. 21, 2011.

(51) Int. Cl.
| | | |
|---|---|---|
| F24J 2/52 | (2006.01) | |
| H01L 31/048 | (2014.01) | |
| F24J 2/46 | (2006.01) | |

(52) U.S. Cl.
CPC ............. *F24J 2/5245* (2013.01); *Y02E 10/47* (2013.01); *F24J 2002/5294* (2013.01); *Y02B 10/20* (2013.01); *Y02E 10/50* (2013.01); *H01L 31/0484* (2013.01); *Y02B 10/12* (2013.01); *F24J 2002/4667* (2013.01)
USPC .................. 52/704; 52/173.3; 52/98

(58) Field of Classification Search
CPC ...... F24H 2/52; H01L 31/045; H01L 31/0422
USPC ............ 52/705, 173.3, 98, 105, 704
See application file for complete search history.

(56) References Cited

U.S. PATENT DOCUMENTS

| | | | | |
|---|---|---|---|---|
| 6,526,701 | B2 * | 3/2003 | Stearns et al. | 52/24 |
| 8,707,654 | B2 * | 4/2014 | Schaefer et al. | 52/710 |
| 2007/0246039 | A1 * | 10/2007 | Brazier et al. | 126/621 |

FOREIGN PATENT DOCUMENTS

| | | |
|---|---|---|
| DE | 29915067 | 3/2000 |
| DE | 202004005224 | 7/2004 |
| DE | 202006007948 | 9/2006 |
| DE | 102007053556 | 5/2009 |
| DE | 102008012717 | 9/2009 |
| DE | 102008034409 | 1/2010 |
| DE | 102010036305 | 1/2012 |
| EP | 1619727 | 1/2006 |
| FR | 2443544 | 7/1980 |
| FR | 2831576 | 10/2001 |
| WO | 2007093421 | 8/2007 |
| WO | WO 2007/093421 | * 8/2007 |

* cited by examiner

*Primary Examiner* — Andrew J Triggs
(74) *Attorney, Agent, or Firm* — Volpe and Koenig, P.C.

(57) ABSTRACT

A device (100) for securing a support structure such as solar module-carrier (12) to a flat roof (16) which is provided with a non-bearing insulation layer (24) covered by a sealing strip (22). The device (100) has an upper connection element (150) for the support structure and a spacer member (120) which can be guided through an opening (26) in the insulation layer (24) in order to support the connection element (150) on a roof substructure (17). The spacer member (120) is anchored by a plurality of anchoring parts (28) on the roof substructure (17). The connection element (150) comprises an upper and a lower connection flange (152, 154) between which the sealing strip (22) is clamped. The spacer member (120) is designed as a profile or hollow-profile part which can be cut to length as required and is produced as an extrusion part from a thermal insulation material.

14 Claims, 5 Drawing Sheets

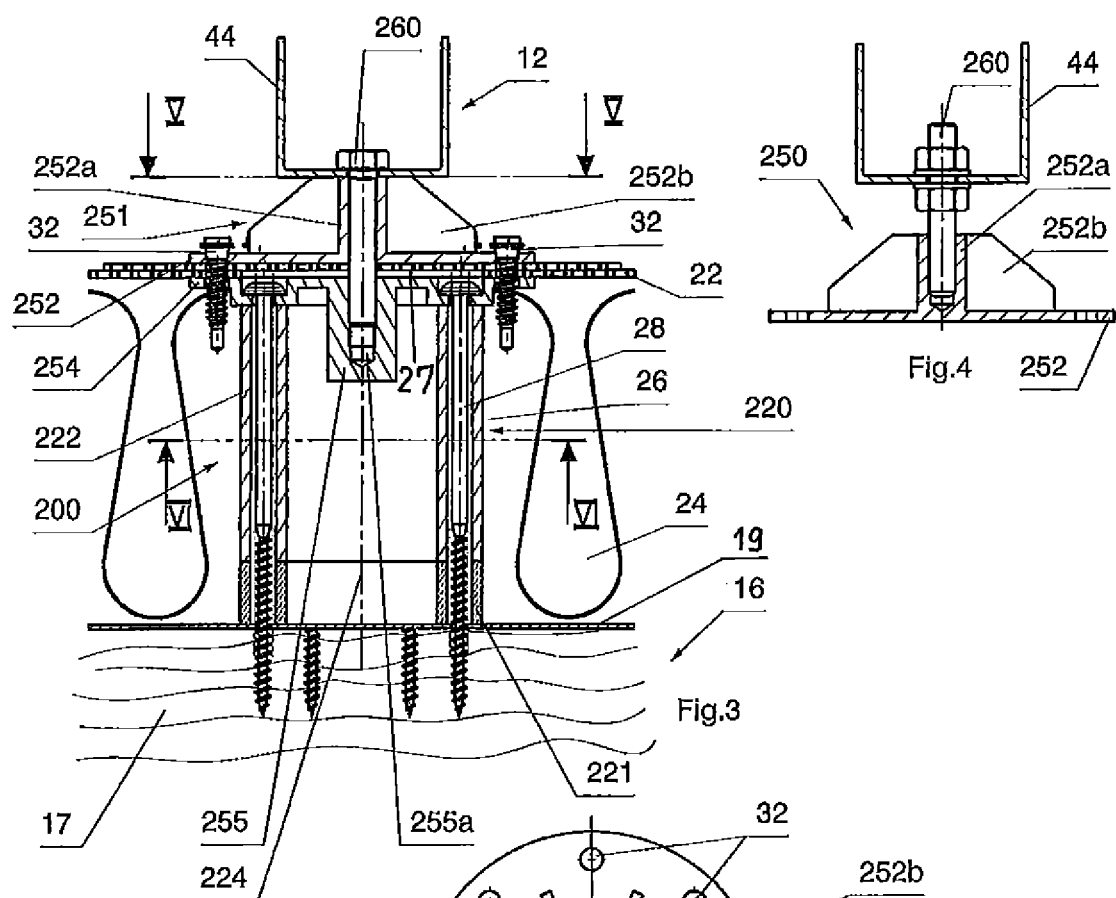
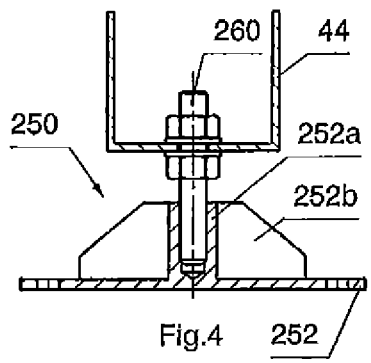
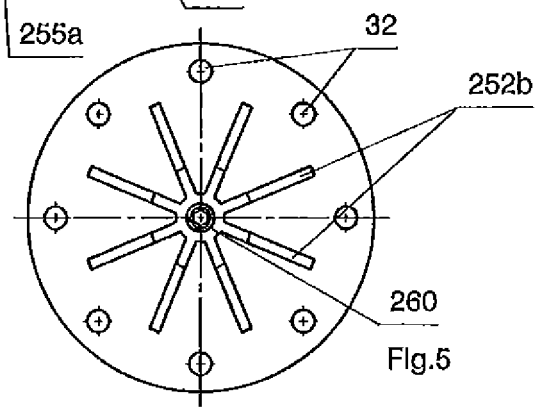
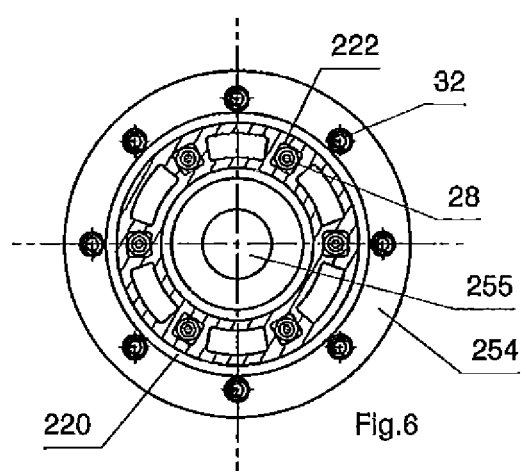

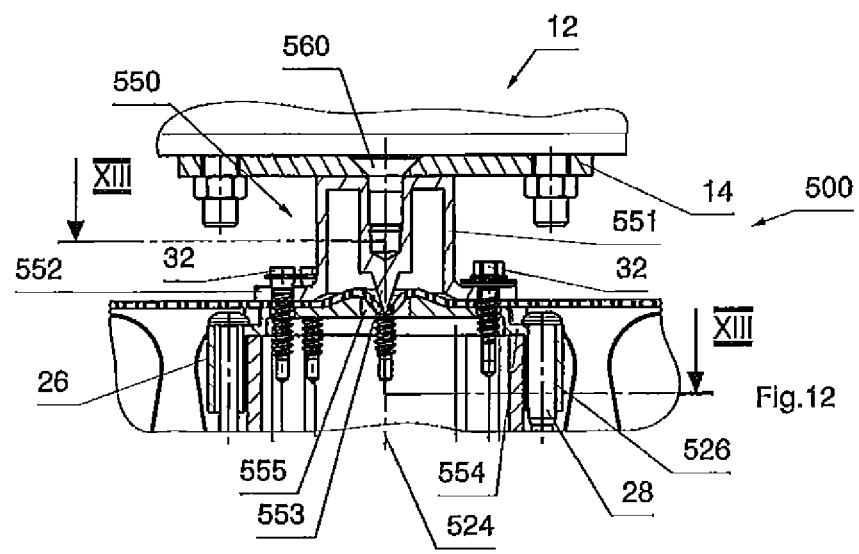
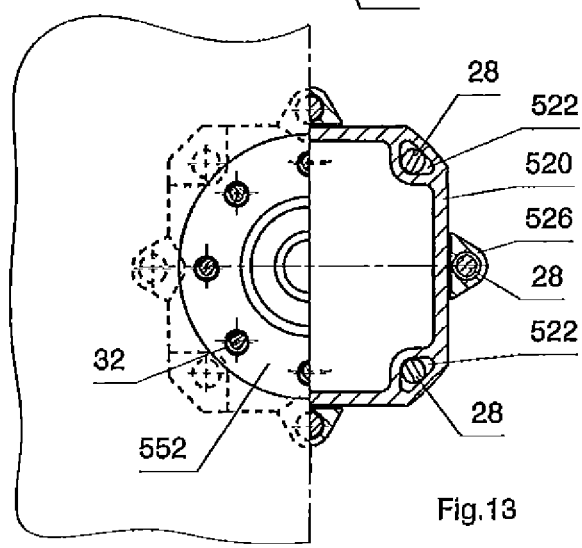

DEVICE FOR SECURING A SUPPORT STRUCTURE TO A FLAT ROOF

CROSS-REFERENCE TO RELATED APPLCIATIONS

This application is a continuation of PCT/EP2011/060341, filed Jun. 21, 2011, which claims the benefit of German Patent Application No. 102010036305.7, filed Jul. 8, 2010, both of which are incorporated herein by reference as if fully set forth.

BACKGROUND

The invention relates to a device for securing a support structure, such as a stand, frame, profile part, or solar module carrier on a flat roof, provided with an insulating layer covered by a sealing strip, comprising an upper connection element for the support structure, a spacer member that can be passed through an opening in the sealing strip and the insulating layer to support the upper connection element on a roof sub-structure, and at least one anchor part to anchor the spacer member on the roof sub-structure.

One fastening device is known from the document DE 20 2004 005 224 U1, which is here called an assembly system, which is particularly embodied to form an upper connection element as a profile adapter, which guides a profile carrier in a displaceable fashion. The assembly system comprises an assembly foot, which is anchored perpendicularly in reference to the longitudinal carrier on the roof sub-structure using two anchor fasteners. In order to support the upper connection element on the roof sub-structure two spacer parts embodied cup-shaped are used, which contact the supporting roof sub-structure with a bottom. Two holes must be produced in the insulating layer for the two spacer parts, which additionally must be aligned with bores for an anchor fasteners in the assembly foot. The assembly of each assembly foot is therefore complicated. Furthermore, the tipping stability of the assembly foot, with its base area being a narrow rectangle, is respectively low. Longitudinal carriers are necessary to compensate the low tipping stability, which connect the assembly feet arranged successively. If a punctual fastening of a support structure is necessary instead of longitudinal carriers, thus no longitudinal carrier is present, the tipping stability cannot be improved. Finally, the assembly system of prior art is designed for certain thicknesses of insulation materials. In case of different thicknesses of insulation materials differently embodied spacer parts must be used. This assembly system of prior art is not suitable for the assembly of solar modules on already existing flat roofs, because the insulation layer must be passed through the two pressure plates, thus can only be applied subsequently when the cup-shaped spacer parts with the lower pressure plate already rest on the roof sub-structure.

A similar fastening device known from the document DE 20 2006 007 948 U1 forms a support system to introduce loads via a support structure into a carrying roof sub-structure with a trapezoid sheet metal, which rests on the binders of the roof sub-structure. A foot element at the lower end of the spacer part is provided to connect to the roof sub-structure, which stands on the recessed beads of the trapezoid sheet metal and can be fastened on the binders. The spacer part extends between the foot element and the connection element and is connected to these two elements. The foot element overlaps the raised bead of the trapezoid sheet metal in order to rest directly on the roof sub-structure. Accordingly it is so wide that it cannot be guided through the sealing strip and the insulation layer for assembling the fastening device, but must be assembled on the trapezoid sheet metal before the sealing strip and the insulation layer are applied on the trapezoid sheet metal. This aggravates the subsequent application e.g., of solar modules for photovoltaic and collector installations on already existing flat roofs, which are already provided with a sealing strip and an insulation layer. In order to allow connecting the fastening device of prior art with the roof sub-structure first at least the sealing strip must be removed and the insulation layer be opened so that the foot element can be placed on two adjacent recessed beads precisely above the binder and then screwed via two screws to the binder. Only thereafter the sealing strip can be reapplied. Finally, the spacer part can project far beyond the sealing strip so that the sealing strip can be pulled up at the spacer part for sealing purposes and connected thereto in a sealing fashion.

In another, similar fastening device known from the document EP 1 619 727 A2 the spacer parts are embodied as anchor feet, each comprising a plate as a foot part which can be fixed via a screw connection, by which they are directly screwed onto the supportive sub-structure. This fastening device is even less suitable for a subsequent assembly on an existing flat roof, because the anchor feet penetrate not only the insulation layer but also the trapezoid sheet metal.

In a roof fastening device of prior art known from the document DE 10 2007 053 556 A1 a penetration element is provided, which comprises a threaded rod, which is welded to a cover element. Such a roof fastening device can be fastened on an existing flat roof subsequently because for the penetration element only one bore hole must be created, which penetrates the sealing strip and the insulating layer. The threaded rod can be guided through a trapezoid sheet metal and directly anchored in the roof sub-structure. In order to improve the sealing the cover plate is sealed at the sealing strip. This roof fastening device can therefore be used on an existing flat roof, however the carrying capacity and the stability with regards to tipping and torsion are relatively limited by the use of a threaded rod as the penetration element.

A fastening device of the type mentioned at the outset is known from the document WO 2007/093421 A2. In this fastening device the spacer device is formed by three units. The roof skin must be cut open, so that these three units can be inserted. One of the units carries a sealing collar, which subsequently must be glued or welded to the remaining roof skin. The units comprise two large-area support plates, between which a threaded rod is screwed in as a spacer element in threaded sections of two tube sections, which are welded to the support plates. Due to the large-area support plates the roof skin including the insulation layer must be cut open over a large area. As already mentioned, the use of a threaded rod as a spacer element is problematic with regards to stability concerning tipping and torsion. Finally, in this fastening device the threaded rod is the only variable part of an assembly group formed from three units, which must be warehoused in various lengths.

From the document FR 2 831 576 A1 a block is known for fastening a support rod of a banister or a barrier. The fastening block serves to fasten a holding rod or a rod carrying a safety barrier on a concrete plate, which may represent a balcony or terrace plate. This plate is coated with a sealing and insulating layer, with at least a portion being pulled upwards at the block. The block embodied like a bushing is screwed to a base showing a greater diameter. The sealing and insulating layer can be pulled upwards at the block after the assembly of said block resulting in the type of assembly problems described above.

SUMMARY

The objective of the invention is to embody a fastening device of the type mentioned at the outset such that flat roofs with most differently thick insulation layers can be retrofitted without any problems and that here high holding forces as well as stability with regards to tipping and torsion can be achieved.

This objective is attained according to the invention in a device of the type mentioned at the outset, such that a spacer device represents a spacer part embodied as a cylindrical and/or tubular profile or hollow profile part, which is embodied for each flat roof that it can be cut to length according to the insulation layer and the sealing strip and can be placed with its base directly and over its full area through the openings on the roof sub-structure, with at the radially exterior edge of the profile or hollow profile part axially penetrating hollow chambers or grooves are formed extending in the longitudinal direction, respectively serving as a guide element for an anchor fastener.

The existing flat roof can easily be retrofitted with the fastening device according to the invention because in the sealing strip and the insulating layer only intersecting cuts and/or small openings or bores must be created, with the diameter or the clear width of the openings in the sealing strip and the insulating layer essentially being equivalent to the diameter or the thickness of the spacer part. The individual spacer part comprising the spacer device can then be guided into these openings and anchored via the anchor fasteners directly on the roof sub-structure, with the guide elements facilitating the placement of the anchor fasteners. The cutting to length, which may be performed on site, generally occurs such that the spacer part essentially ends flush with the sealing strip after placement. Subsequently the sealing strip is resealed at the insertion site of the spacer part, beneficially with the help of the upper connection element on which then a solar module carrier can be fastened. Strong holding forces are ensured here because the cylindrical spacer part shows a large base area, by which it rests directly and over its entire surface on the roof sub-structure. This way, and by the multitude of anchor fasteners used the stability regarding tipping and torsion is also ensured. The fastening device according to the invention can be easily installed subsequently because for its assembly operation is required only from the top.

Advantageous embodiments of the fastening device according to the invention represent the objectives of the dependent claims.

In one embodiment of the fastening device according to the invention, the axially penetrating hollow chamber or the groove is embodied in the spacer part or in a projection at the spacer part, which extends from the upper end of the spacer part only slightly towards the bottom.

In another embodiment of the fastening device according to the invention the spacer part comprises a longitudinal axis and a hollow chamber on a virtual circle and/or in a corner of a virtual polygon around a longitudinal axis. This way a particularly secure anchoring of the spacer part, stable with regards to torsion and tipping, is yielded on the roof sub-structure.

In another embodiment of the fastening device according to the invention the upper connection element comprises an upper and a lower connection flange to clamp the sealing strip. This embodiment allows the creation of a sealed connection of the device to the sealing strip in a simple fashion.

In another embodiment of the fastening device according to the invention the upper connection flange represents a part of the connection part of the connection element. This way the fastening device can easily be adjusted to any embodiment of a solar module carrier regardless if it represents a stand, a frame, or a profile part.

In another embodiment of the fastening device according to the invention at least the lower connection flange is fastened by the anchor fasteners on the spacer part. This way stability with regards to torsion and tipping is also ensured between the connection flange and the spacer part simply by the placement of the anchor fasteners.

In another embodiment of the fastening device according to the invention the upper connection flange is fastened on the lower connection flange by additional fasteners. This expands the connection options and (allows) different embodiments of the connection element and still ensures a safe fastening of the upper connection flange on the lower connection flange and a sealed clamping of the sealing strip.

In another embodiment of the fastening device according to the invention the additional fasteners are arranged on a virtual circle about the longitudinal axis, which is located radially inside or outside the virtual circle of the guide element or elements. In this embodiment a symmetrical and consistent mutual fastening of the two connection flanges is achieved.

In another embodiment of the fastening device according to the invention the upper and the lower connection flange show centering elements for a mutual centering. This way the assembly of the fastening device according to the invention is additionally facilitated.

In another embodiment of the fastening device according to the invention additionally or alternatively to these centering elements the connection element is provided with a ring as a centering aid. In this embodiment the ring may represent e.g., a magnetic ring so that the centering of the spacer part can be achieved in a contactless fashion and without piercing the sealing strip.

In another embodiment of the fastening device according to the invention the connection part is provided with a connection fastener for connecting to the support structure or for connecting to other connection elements. This embodiment expands the options for use of the fastening device.

In another embodiment of the fastening device according to the invention the spacer part represents an extruded profile or a hollow profile part. This embodiment allows a simple production of the spacer part, particularly from an electrically and/or thermally insulating and/or oscillation muffling material.

In another embodiment of the fastening device according to the invention the anchor fastener represents a screw, a self-tapping or thread molding screw, or a spike, a concrete nail, or the like. In this embodiment the anchoring of the fastening device may be shaped according to the embodiment of the roof sub-structure in which the anchor fastener shall be anchored.

In another embodiment of the fastening device according to the invention the spacer part is provided with a base plate. The base plate may be embodied as a thermally and/or electrical and/or oscillation muffling insulation element or generally as a separating element made from a material other than the spacer part. Being a thermally insulating element it contributes to the reduction of thermal bridges. Here, the base plate serves no purpose, like the one of the foot element in the generic fastening device according to the above-discussed DE 20 2006 007 948 U1 but it is embodied as an element similar to the spacer part itself. The base plate could therefore be embodied like a lower section which is separated from the remaining part of the spacer part, shows the same cross-section; however, comprises a different material, for example.

In the simplest case the spacer part is simply embodied in two parts, with the bottom part being placed with the spacer part on the roof sub-structure, optionally comprising the same material as the spacer part or a different one.

BRIEF DESCRIPTION OF THE DRAWINGS

In the following, exemplary embodiments of the invention are explained in greater detail with reference to the drawings. Shown are.

DETAILED DESCRIPTION OF THE PREFERRED EMBODIMENT

Figure 1:
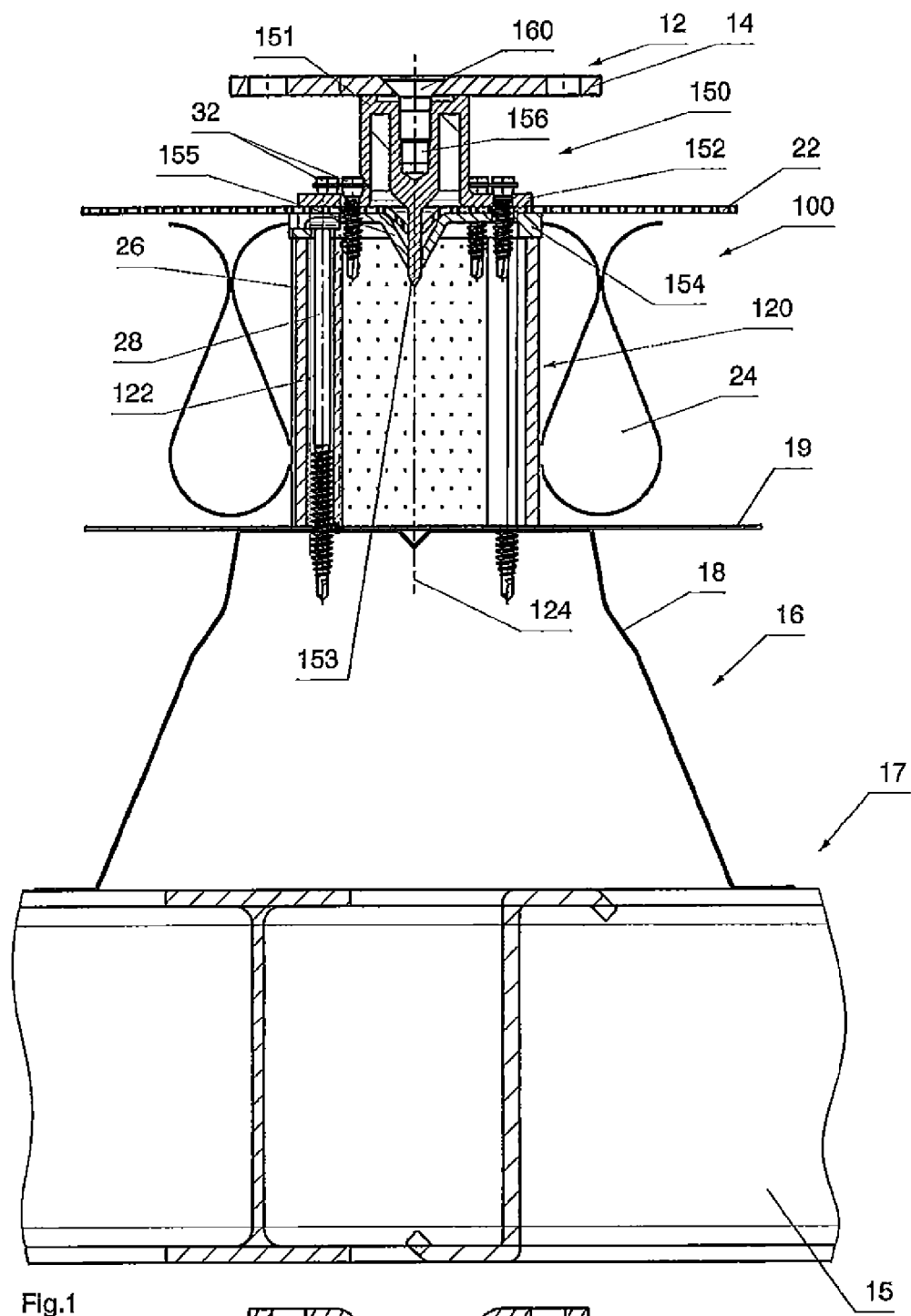
FIG. 1 a first exemplary embodiment of a fastening device according to the invention in a longitudinal cross-section, FIG. 2 a detail of a modification of the fastening device according to FIG. 1, FIG. 3 a second embodiment of the fastening device according to the invention in a longitudinal cross-section, FIG. 4 a detail of a modification of the fastening device according to FIG. 3, FIG. 5 a cross-sectional view along the line V-V in FIG. 3, FIG. 6 a cross-sectional view along the line VI-VI in FIG. 3, FIG. 7 a third embodiment of the fastening device according to the invention in a longitudinal cross-section, FIG. 8 a cross-sectional view along the line VIII-VIII in FIG. 7, FIG. 9 a fourth embodiment of the fastening device according to the invention in a longitudinal cross-section along the line IX-IX in FIG. 10, FIG. 10 a cross-sectional view along the line X-X in FIG. 9, FIG. 11 a cross-sectional view along the line XI-XI in FIG. 9, FIG. 12 a fifth embodiment of the fastening device according to the invention in a longitudinal cross-section, and FIG. 13 a cross-sectional view along the line XIII-XIII in FIG. 12.

FIG. 1 shows a first embodiment of a fastening device according to the invention in a longitudinal cross-section, overall marked 100. The device 100 serves to fasten a support structure, such as a stand, frame, profile part, or a solar module carrier 12 selected here as the example for the description, of which here only a flat profile part 14 is shown, on an flat roof overall marked 16, which shows a roof sub-structure 17 comprising a roof carrier 15 and a trapezoid sheet metal 18 fastened thereon and shown in a cross-section as well as a vapor barrier 19 applied on said trapezoid sheet metal. The flat roof 16 is provided with an insulating layer 24, usually of little or no load bearing capacities and covered by a sealing strip 22.

The fastening device 100 comprises a spacer device, which essentially includes a spacer, overall marked 120, which can be guided through an opening 26 in the insulating layer 24 (and according to FIG. 3 through an opening 27 in the sealing strip 22) on which an upper connection element 150 is arranged for the solar module carrier 12. The spacer part 120 supports the connection element 150 directly on the roof sub-structure 17. The spacer part 120 is typically an extruded or hollow profile part provided with a large base area, which may show a cross-section as illustrated in FIG. 4, 8, 10, or 13, explained in greater detail in the following.

The spacer part 120 is a cylindrical hollow profile part, with its interior chamber preferably being foamed as indicated in FIG. 1. At the radially exterior edge of the spacer part 120 axially penetrating hollow chambers 122 are formed, circular in their cross-section in the exemplary embodiment shown, each of which serving as a guide element for an anchor fastener 28, in the exemplary embodiment shown in FIG. 1 representing a self-tapping or thread-molding screw. The hollow chambers 122 may be radially open at the exterior or partially open, i.e. embodied as grooves extending in the longitudinal direction and more or less open towards the outside, with their cross-section may show a C or V-shape.

The connection element 150 comprises a connection part 151, showing an upper connection flange 152 at its lower end in FIG. 1, and a lower connection flange 154. The hollow spaces 122 of the spacer part 120 are arranged in equal distances on a virtual circle about a longitudinal axis 124 of the spacer part 120. The lower connection flange 154 shows at its upper side recesses for the head of the anchor fastener 28, which match the hollow spaces 122, thus are equivalent to the partial hole image of the spacer part 120. When the anchor fastener 28 is guided through the lower connection flange 154 and is screwed into the upper strip of the trapezoid sheet metal 18 it finally contacts with its head the top of the lower connection flange 154 so that with the anchoring of the spacer part 120 on the roof sub-structure 17 simultaneously also the lower connection flange 154 is anchored on the spacer part 120. The upper connection flange 152 is provided with openings through which additional fasteners 32 are screwed into the lower connection flange 154 in order to anchor the upper connection flange 152 formed at the connection part 151 on the lower connection flange 154 and thus on the spacer part 120.

The upper and the lower connection flanges 152, 154 show centering elements 153 and/or 155 for a mutual centering. In the exemplary embodiment shown and described here the centering element 153 is a central tip formed at the connection part 151 and projecting downwards. The centering element 155 is a conical recess in the lower connection flange 154, into which the centering element 153 is inserted from the top as shown in FIG. 1. Finally the connection part 151 is provided at the top with a central bore 156, in which a fastening element is screwed as a connection fastener 160 in order to anchor the flat profile part 14 on the connection part 151.

When assembling the fastening device 100 the sealing strip 22 is clamped between the upper connection flange 152 and the lower connection flange 154 of the connection element 150, as shown in FIG. 1, when the additional fasteners 32 are tightened. The additional fasteners 32 are also self-tapping and thread molding screws in the exemplary embodiment according to FIG. 1.

Figure 2:
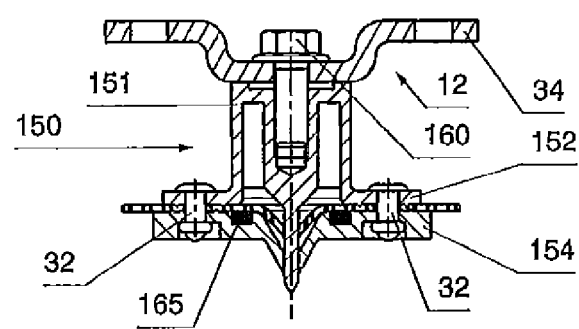

FIG. 2 shows a detail of a modification of the fastening device 100 according to FIG. 1, in which the solar module carrier 12 is indicated as a. U-profile part 34. The U-profile part 34 is fastened on the connection part 151 of the connection element 150 by a connection fastener 160, which represents a screw with a hexagon head, which is accepted by the U-profile part 34. The connection element 150 is provided with a ring 165, inserted into an annular groove in the top of the lower connection flange 154. The ring 165 may represent a magnetic ring, for example, which can be used as a centering aid so that the centering of the spacer part 120 can be achieved touchlessly and without piercing the sealing strip 22. The ring 165 particularly embodied as a magnetic ring, may be used alternatively or additionally to the centering elements 153, 155. The additional fasteners 32 by which the upper and the lower connection flanges 152, 154 are connected to each other represent rivets in the exemplary embodiment shown in FIG. 2. The connection element 150 may be connected to the spacer part 120 via its lower connection flange 154 and via anchor fasteners 28. The anchor fasteners 28 and the spacer part 120 are not shown in FIG. 2.

In order to fasten the solar module carriers 12 on the flat roof 16 the spacer part 120 is first cut to length according to the object. According to the object means that the length of the spacer part 120, which is produced as an excessively long extrusion part comprising a thermally isolating material, is adjusted in the factory or at the construction site to the thickness of the insulating layer 24 already existing on the flat roof or to be applied to said flat roof. When the insulating layer 24 is already present an opening 26 is created at the anchoring site to be provided in the insulating layer 24 on the flat roof 16 with its diameter or clear width being equivalent to the diameter and/or the thickness of the spacer part 120. If the sealing strip 22 is already present it is cut such that the spacer part 120 can be guided through the opening 27 (FIG. 3) in the sealing strip 22. When the spacer part 120 rests on the upper belt 19 and the lower connection flange 154 on the spacer part 120 the sealing strip 22 is sealed above the lower connection flange 154 or, if the sealing web 22 was not present previously, now the sealing strip is applied. Subsequently the connection part 151 is placed thereon, with the centering occurring by the centering elements 153, 155. Using the additional fasteners 32 the connection part 151 is fastened on the spacer part 120 by the additional fasteners 32 being screwed into the connection flanges 152, 154. Finally the flat profile part 14 is fastened on the connection part 151 with the help of the connection fastener 160. The other parts of the solar module carriers 12 can now be fastened on the flat profile part 14 as needed. The connection in the area of the spacer part 120 is sealed because the sealing strip 22 is clamped between the connection flanges 152, 154. Sealing element, such as the sealing ribs 166 mentioned in the following and provided according to FIG. 11 at the bottom of the upper connection flange 152, provided at the connection element 150 lead to an additional sealing effect, but additionally and alternatively they may be provided at the top of the lower connection flange 154. The connection flanges 152, 154 may be riveted to each other instead of screwed, as already described in reference to FIG. 2.

FIG. 3 shows a second embodiment of the fastening device according to the invention in a longitudinal cross-section, here marked 200 in its entirety. Similar to FIGS. 1 and 2, identical parts show the same reference characters as in FIG. 3 so that a repeated description of such parts can be waived.

The spacer part 220 shows essentially the same design as the spacer part 120 according to FIGS. 3, 5, and 6. Compared to the fastening device 100 particularly the embodiment of the upper and the lower connection flange 252, 254 are different in the fastening device 200. According to the illustration in FIG. 3 a central socket 252a is formed at the upper connection flange 252, which according to FIG. 5 is supported by ribs 252b equally spaced over the circumference, which are formed at the upper connection flange 252 and at the socket 252a. Further, in the description of the fastening device 200 it is assumed that the roof sub-structure 17 comprises wooden rafters. The anchor fasteners 28 accordingly represent wood screws, as shown, by which the hollow chambers 222 are screwed through the spacer part 220 into a wooden rafter. Further, it is distinguished that the additional fasteners 32 are arranged on a virtual circle about the longitudinal axis 224 of the spacer part 220, which is located radially outside the virtual circle of the guide elements, thus the hollow spaces 222. The other fasteners 32 are here self-tapping and thread molding screws, which are screwed through the bores in the upper connection flange into the lower connection flange 254.

Further, the fastening device 200 differs in the centering element 255 embodied at the lower connection flange 254 such that it represents a cylindrical pin, which shows a blind bore 255a with an internal thread, into which a connection fastener 260 can be screwed, which represents a machine screw with a hexagon head in the exemplary embodiment shown, which is guided through the socket 252a and is then screwed into the blind bore 255a. Further it is distinguished that the U-profile part of the solar module carrier 12 is here embodied differing from the U-profile part 34 according to FIG. 2 and thus marked 44.

The spacer part can be provided with a base plate in all embodiments of the fastening device, which are shown in the drawings and described here. Such a base plate 221 is indicated in FIG. 3 as an example for all embodiments. The base plate 221 comprises a lower section 220, separated from the remaining spacer part 220. The base plate 221 may comprise a different material than the spacer part 220, representing an insulating element or generally a separating element, however it preferably shows the same dimensions and the same form of the cross-section as the other spacer part 220 and, if it is produced as an extruded or hollow profile part, is also produced as such an extrusion profile or hollow profile part. The spacer part 220 according to FIG. 3 is therefore embodied in two parts.

FIG. 4 shows a detail of a modification of the fastening device 200 according to FIG. 3. In this modified embodiment the lower connection flange 254 (not shown) is not provided with the centering element 255. For this purpose, the socket 252a comprises a blind bore with an interior thread into which a threaded rod is screwed as a connection fastener 260. The U-profile part 44 is anchored via two countered nuts on the threaded rod, as shown in FIG. 4.

Figure 7:
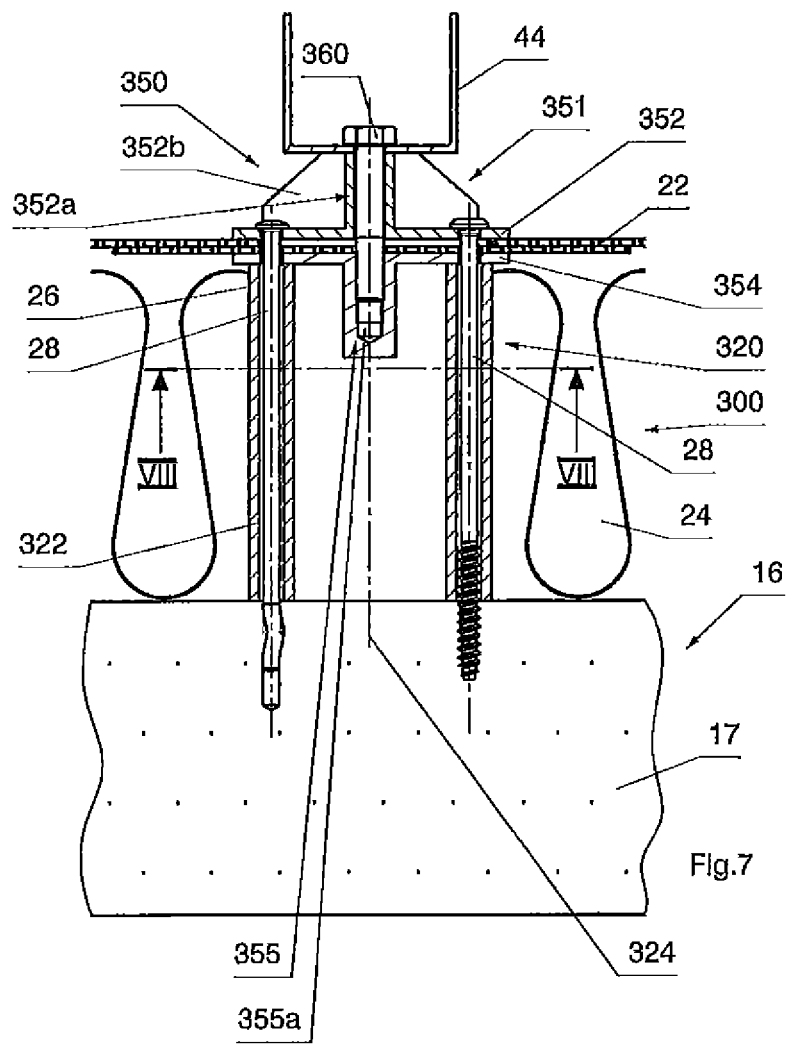

FIG. 7 shows a third embodiment of the fastening device according to the invention in a longitudinal cross-section, which is marked 300 in its entirety. As an example the fastening device 300 is fastened on a roof sub-structure 17 representing a concrete carrier. Thus, spikes may be inserted as anchor fasteners 28, with in FIG. 7 one spike being shown left next to the longitudinal axis 324, or stone screws, with one stone screw in FIG. 7 being shown at the right of the longitudinal axis 324. The lower connection flange 354 is provided with a centering element 355, similar to FIG. 3, which is embodied as a central socket with a blind bore 355a showing an internal thread. The upper connection flange 352 of the connection part 351 of the connection element 350 is provided with a socket 352a reinforced by ribs 352b. Additional fasteners, such as the fasteners 32, are not required in the embodiment according to FIGS. 7 and 8 because the anchor fasteners 28 are guided through both connection flanges 352, 354 in order to anchor them together with the spacer part 320 on the roof sub-structure 17 and to clamp the sealing strip 22 between the upper and the lower connection flange 352, 354. The connection fastener 360 ensures the mutual centering of the two connection flanges 352, 354, guided through the socket 352a and screwed into the blind bore 355a. Similar to the exemplary embodiment according to FIG. 3 a machine screw serves as the connection fastener 360 with a hexagon head to fasten the U-profile part 44 on the connection part 151.

Figure 8:
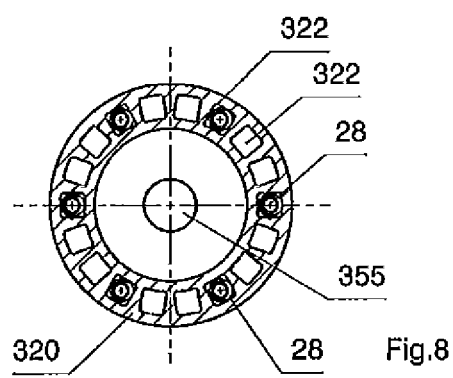

FIG. 8 is a cross-section along the line VIII-VIII in FIG. 7. Eighteen hollow chambers 322 are discernible in this cross-section, with six of them being selected as guide elements for six anchor fasteners 28.

Figure 9:
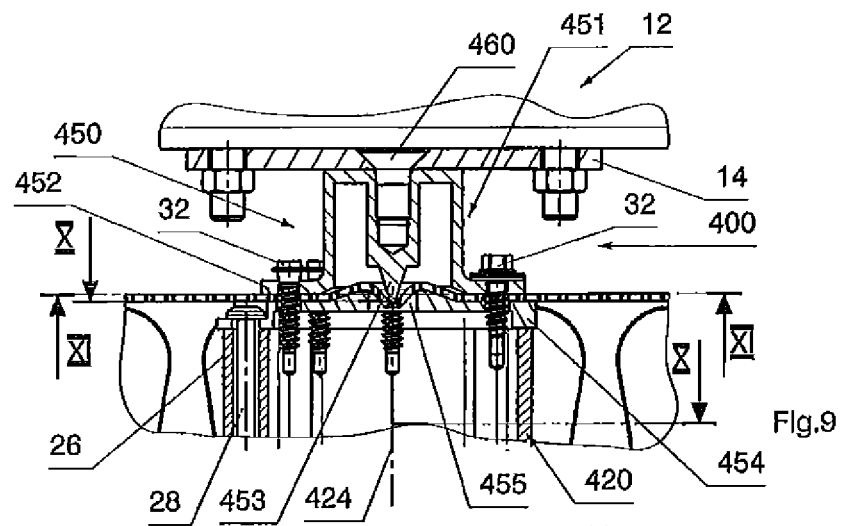
Figure 10:
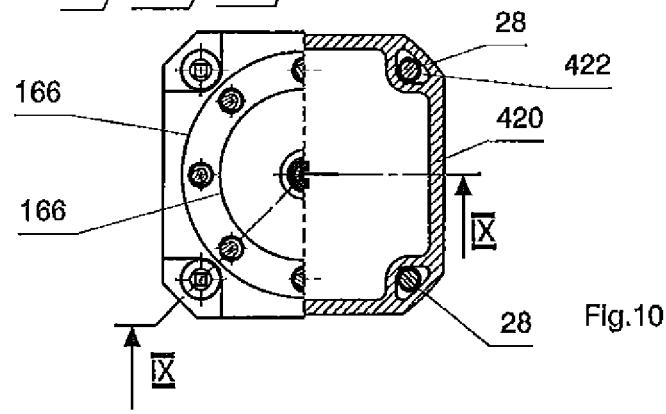
Figure 11:
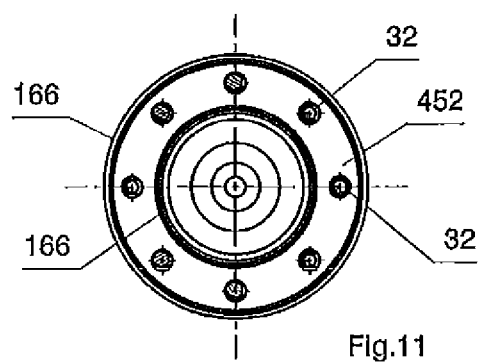

FIG. 9 shows a fourth embodiment of the fastening device according to the invention in a longitudinal cross-section along the line IX-IX in FIG. 10, which is marked 400 in its entirety. FIG. 10 shows a cross-section along the line X-X in FIG. 9. FIG. 11 shows a cross-section along the line XI-XI in FIG. 9. It is distinguished, for example in reference to the embodiment according to FIGS. 3, 5, and 6, that the upper connection flange 452 is embodied circular as discernible from FIG. 11 and that the lower connection flange 454 and the cross-section of the spacer element 420 is essentially embodied square, as discernible in FIG. 10. The connection element 450 shows essentially the same design as the connection element 150. The hollow chambers 422 serving as guide elements for four anchor fasteners 28 are embodied as corners of the spacer parts 420.

FIG. 12 shows a fifth embodiment of the fastening device according to the invention in a longitudinal cross-section, in its entirety marked 500. FIG. 13 shows a cross-section along the line XIII-XIII in FIG. 12. The embodiment of the fastening device 500 differs from the one of the fastening device 400 primarily such that for fastening the spacer part 520 on the roof sub-structure additionally or differently arranged anchor fasteners 28 are used. The differently arranged anchor fasteners 28 are arranged in projections 528 which are formed at the outside of the four sides of the spacer part 520 centrally or in a different manner. A hollow chamber 522 may be embodied in each projection 528 as a guide element for the anchor fastener 28, such as in the corners of the spacer part 520. The projections 526 extend from the upper end of the spacer part 520 only a short distance downwards, thus not over the entire height of the spacer part 520, as discernible in FIG. 12. The centering of the connection part 551 occurs via centering elements 553 and 555, similar to the fastening device 400 according to FIGS. 9 to 11. The sealing ribs 166, already mentioned in the context with the fastening device 100, are embodied at the bottom of the upper connection flange 452 and/or at the top of the lower connection flange 454 and may be made from rubber, for example.

LIST OF REFERENCE CHARACTERS

12 Solar module carrier
14 Flat profile part
15 Roof carrier
16 Flat roof
17 Roof sub-structure
18 Trapezoid sheet metal
19 Vapor barrier
22 Sealing strip
24 Insulation layer
26 Opening (in the insulation layer)
27 Opening (in the sealing strip)
28 Anchor fastener
32 Additional fastener
34 U-profile part
44 U-profile part
100 Fastening device
120 Spacer part
122 Hollow chamber
124 Longitudinal axis
150 Upper connection element
151 Connection element
152 Upper connection flange
153 Centering element
154 Lower connection flange
155 Centering element
156 Central bore
160 Connection fastener
165 Ring
166 Sealing lip
200 Fastening device
220 Spacer part
221 Base plate
222 Hollow chamber
224 Longitudinal axis
250 Upper connection element
251 Connection part
252 Upper connection flange
252a Socket
252b Rib
254 Lower connection flange
255 Centering element
255a Blind bore
260 Connection fastener
300 Fastening device
320 Spacer part
322 Hollow chamber
324 Longitudinal axis
351 Connection part
352a Socket
352b Rib
360 Connection fastener
350 Upper connection element
352 Upper connection flange
354 Lower connection flange
355 Centering element
355a Blind bore
360 Connection fastener
400 Fastening device
420 Spacer part
422 Hollow chamber
424 Longitudinal axis
450 Upper connection element
451 Connection part
452 Upper connection flange
453 Centering element
454 Lower connection flange
455 Centering element
460 Connection fastener
500 Fastening device
520 Spacer part
522 Hollow chamber
524 Longitudinal axis
526 Projection
550 Upper connection element
551 Connection part
552 Upper connection flange
553 Centering element
554 Lower connection flange
555 Centering element
560 Connection fastener

The invention claimed is:

1. A device for fastening a support structure on a flat roof, which is provided with an insulating layer covered by a sealing strip, the device comprising: an upper connection element for the support structure, with a spacer device which is configured to be guided through an opening, cut in the sealing strip and the insulating layer, to support the upper connection element on a roof sub-structure, and with anchor fasteners for anchoring the spacer device on the roof sub-structure, the spacer device comprises a spacer part that comprises a longitudinal axis and is produced as an over-length tubular hollow profile extrusion which is comprised of a thermally isolating material and is cut to length according to a thickness of the insulating layer and the sealing strip by cutting a length from the over-length hollow profile extrusion to form a hollow profile extrusion part that is adapted to be placed through the openings directly over an entire base area thereof on the roof sub-structure, the opening in the insulating layer having a diameter or clear width which is equivalent to a diameter or thickness of the tubular hollow profile extrusion part, the opening being sized to receive the tubular hollow profile extrusion part, the spacer device further comprises axially penetrating hollow chambers or grooves extending in a longitudinal direction of the tubular hollow profile extrusion part and being provided at a radially exterior edge of the tubular hollow profile extrusion part, each of which serves as a guide element for respective ones of the anchor fasteners to facilitate placement of the anchor fasteners.

2. A device according to claim 1, wherein the axially penetrating hollow chambers or the grooves in the spacer part or in a projection of the spacer part are configured to extend from an upper end of the spacer part only a short distance towards a bottom of the spacer part.

3. A device according to claim 2, wherein the hollow chambers are arranged on at least one of a virtual circle or in a corner of a virtual polygon about the longitudinal axis.

4. A device according to claim 3, wherein the upper connection element comprises an upper connection flange and a lower connection flange to clamp the sealing strip.

5. A device according to claim 4, wherein the upper connection flange is a part of a connection part of the upper connection element.

6. A device according to claim 5, wherein at least the lower connection flange is fastened via the anchor fastener on the spacer part.

7. A device according to claim 5, wherein the upper connection element is fastened on the lower connection flange by an additional fastener.

8. A device according to claim 7, wherein the additional fasteners are arranged on a virtual circle about the longitudinal axis, which is located inside or outside the virtual circle of each guide element.

9. A device according to claim 5, wherein the upper connection flange and the lower connection flange comprise centering elements for a mutual centering.

10. A device according to claim 9, wherein the upper connection element additionally or alternatively to the centering elements is provided with a ring as a centering aid.

11. A device according to claim 9, wherein the connection part is provided with a connection fastener to connect to the support structure or to connect to other connection elements.

12. A device according to claim 1, wherein the spacer part is an extrusion profile or hollow profile part.

13. A device according to claim 1, wherein the anchor fastener comprises a screw, a self-tapping and/or thread forming screw, a spike, or a concrete nail.

14. A device according to claim 1, wherein the spacer part is provided with a base plate.

* * * * *